(12) United States Patent
Yasui

(10) Patent No.: US 11,297,190 B2
(45) Date of Patent: Apr. 5, 2022

(54) IMAGE FORMING APPARATUS AND CONTROL METHOD FOR THE SAME

(71) Applicant: TOSHIBA TEC KABUSHIKI KAISHA, Tokyo (JP)

(72) Inventor: Kazumasa Yasui, Tokyo (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/126,789

(22) Filed: Dec. 18, 2020

(65) Prior Publication Data

US 2021/0297538 A1  Sep. 23, 2021

(30) Foreign Application Priority Data

Mar. 23, 2020 (JP) .............................. JP2020-050656

(51) Int. Cl.
*G06K 15/00* (2006.01)
*H04N 1/00* (2006.01)

(52) U.S. Cl.
CPC ..... *H04N 1/00074* (2013.01); *H04N 1/00063* (2013.01); *H04N 1/00082* (2013.01); *H04N 1/00408* (2013.01); *H04N 1/00551* (2013.01); *H04N 1/00888* (2013.01); *H04N 2201/0094* (2013.01)

(58) Field of Classification Search
CPC ........... H04N 1/00074; H04N 1/00063; H04N 1/00082; H04N 1/00408; H04N 1/00551; H04N 1/00888; H04N 2201/0094
See application file for complete search history.

(56) References Cited

U.S. PATENT DOCUMENTS

| | | | | |
|---|---|---|---|---|
| 2007/0104495 A1* | 5/2007 | You | ........................ | G03G 15/55 399/9 |
| 2012/0104866 A1* | 5/2012 | Yoo | .................... | G03G 15/5004 307/86 |
| 2015/0248096 A1* | 9/2015 | Kishimoto | ......... | G03G 21/1652 399/9 |
| 2017/0208205 A1* | 7/2017 | Ikeda | ................... | H04N 1/0048 |
| 2018/0089016 A1 | 3/2018 | Tachibana | | |

FOREIGN PATENT DOCUMENTS

JP  2017204885 A  11/2017
JP  2018109684 A  7/2018

OTHER PUBLICATIONS

Extended European Search Report dated Jun. 8, 2021, mailed in counterpart European Application No. 21155314.4, 8 pages.

* cited by examiner

Primary Examiner — Moustapha Diaby
(74) Attorney, Agent, or Firm — Kim & Stewart LLP

(57) ABSTRACT

An image forming apparatus has a controller with a first input terminal configured to receive a first signal indicating a state of a first opening/closing portion, a second input terminal configured to receive a second signal indicating a state of a second opening/closing portion, and a third input terminal configured to receive a third signal indicating a state of the first opening/closing portion and the second opening/closing portion. The controller is configured to delay a first notification of an open state of the first opening/closing portion and a second notification of an open state of the second opening/closing portion for a predetermined period after any one of the first signal, second signal, or third signal initially indicates an open state.

19 Claims, 9 Drawing Sheets

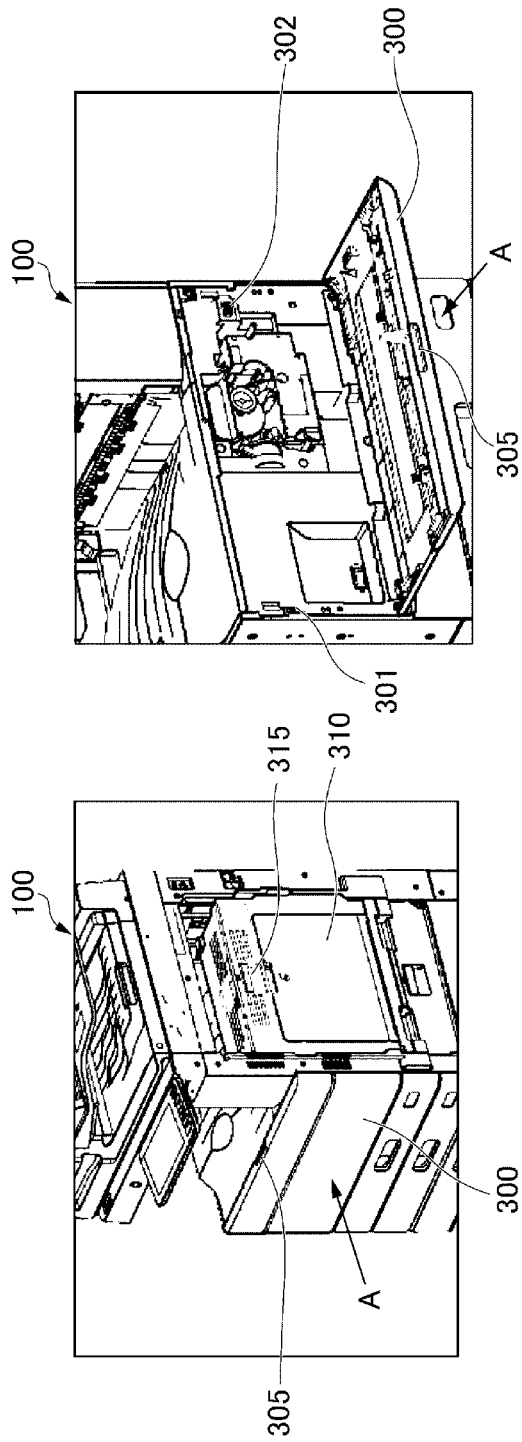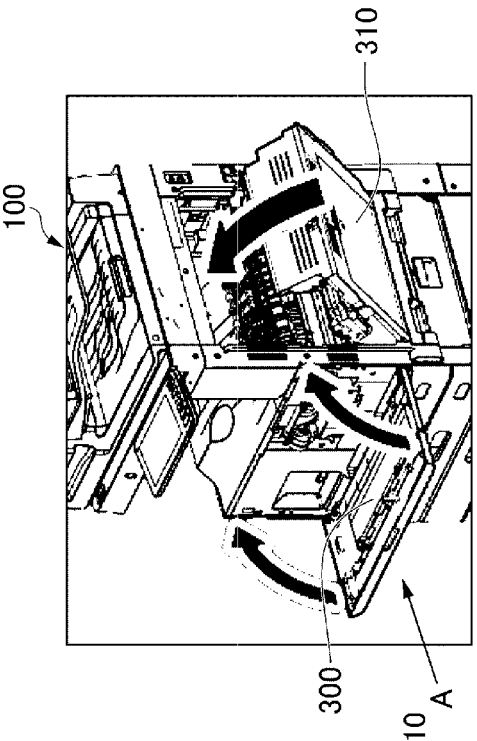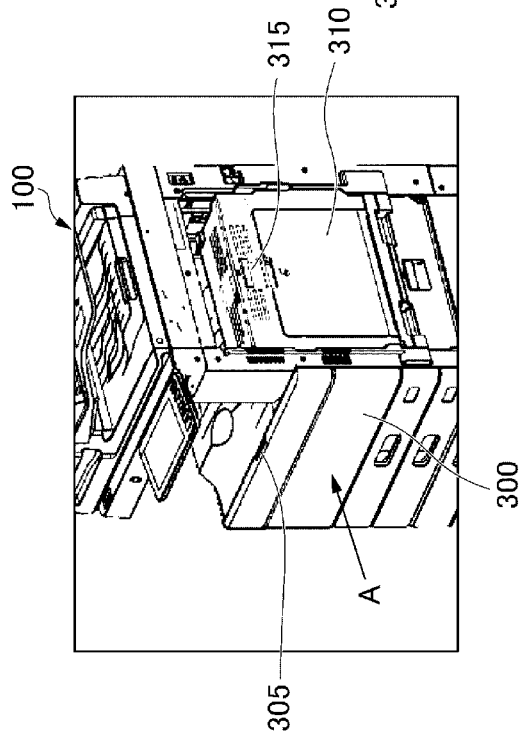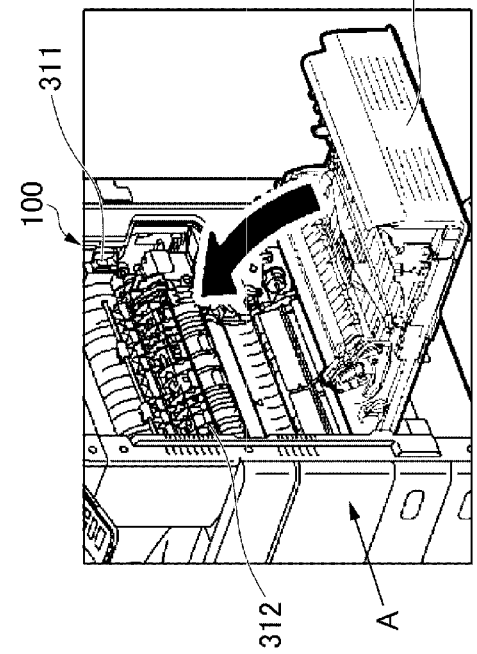

IMAGE FORMING APPARATUS AND CONTROL METHOD FOR THE SAME

CROSS-REFERENCE TO RELATED APPLICATION

This application is based upon and claims the benefit of priority from Japanese Patent Application No. 2020-050656, filed on Mar. 23, 2020, the entire contents of which are incorporated herein by reference.

FIELD

Embodiments described herein relate generally to an image forming apparatus and a control method for an image forming apparatus.

BACKGROUND

In the related art, an image forming apparatus is provided with one or more covers that open and close to provide access to portions of the interior of the apparatus. Examples of such a cover include a front cover and an auto duplex unit (ADU) cover. The front cover is opened, for example, when toner is being replaced. The ADU cover is opened, for example, if a sheet jam occurs.

The image forming apparatus can be provided with a cover switch used to detect when a cover is in an open state. Thus, if the front cover is opened, the open state of the front cover can be indicated on a display. As a related technique, there is a technique in which, when a first voice message or a sound is emitted from a speaker if any cover is detected by a sensor as being open, and a second voice message or sound is emitted from the speaker indicating a particular cover has been opened.

The image forming apparatus can be provided with interlock switches (also referred to as safety switches) used to interrupt a power supply of a drive unit in the apparatus when the cover is opened. An interlock switch for the front cover and an interlock switch for the ADU cover can be separately provided.

In some examples, a signal line for an interlock switch may be shared by switches for the front cover and the ADU cover. That is, a signal (safety signal) detected by each interlock switch separately is input to a device controller through a single, shared signal line. The safety signal can be assigned to just one of the interlock switch on the front cover or the interlock switch on the ADU cover for design convenience in some instances.

When the image forming apparatus is in use, an open state may be detected by either one of an interlock switch and a cover switch. Specifically, in a case of the ADU cover, the open state may be detected by the interlock switch on the ADU cover, and the closed state may be detected by the ADU cover switch. Thus, if the safety signal has been assigned to the interlock switch on the front cover for design convenience, the image forming apparatus may determine that the front cover is in an open state.

However, if a notification of the open state is performed based on this determination result, the front cover is indicated as open despite the ADU cover actually being in the open state. As such, in the image forming apparatus of the related art, there is concern that a user may be provided incorrect information regarding the open state of the covers.

BRIEF DESCRIPTION OF THE DRAWINGS

FIGS. 3A to 3D are explanatory diagrams illustrating configurations of a front cover and an ADU cover for an image forming apparatus according to an embodiment.

DETAILED DESCRIPTION

At least one embodiment of the present disclosure provides an image forming apparatus that provides user notifications regarding various cover states in a manner preventing the user from misrecognizing the notification.

According to an embodiment, an image forming apparatus includes a controller with a first input terminal configured to receive a first signal indicating a state of a first opening/closing portion, a second input terminal configured to receive a second signal indicating a state of a second opening/closing portion, and a third input terminal configured to receive a third signal indicating a state of the first opening/closing portion and the second opening/closing portion. The controller is configured to delay a first notification of an open state of the first opening/closing portion and a second notification of an open state of the second opening/closing portion for a predetermined period after any one of the first signal, second signal, or third signal initially indicates an open state.

Hereinafter, an image forming apparatus and a method according to certain example embodiments will be described with reference to the drawings.

Figure 1:
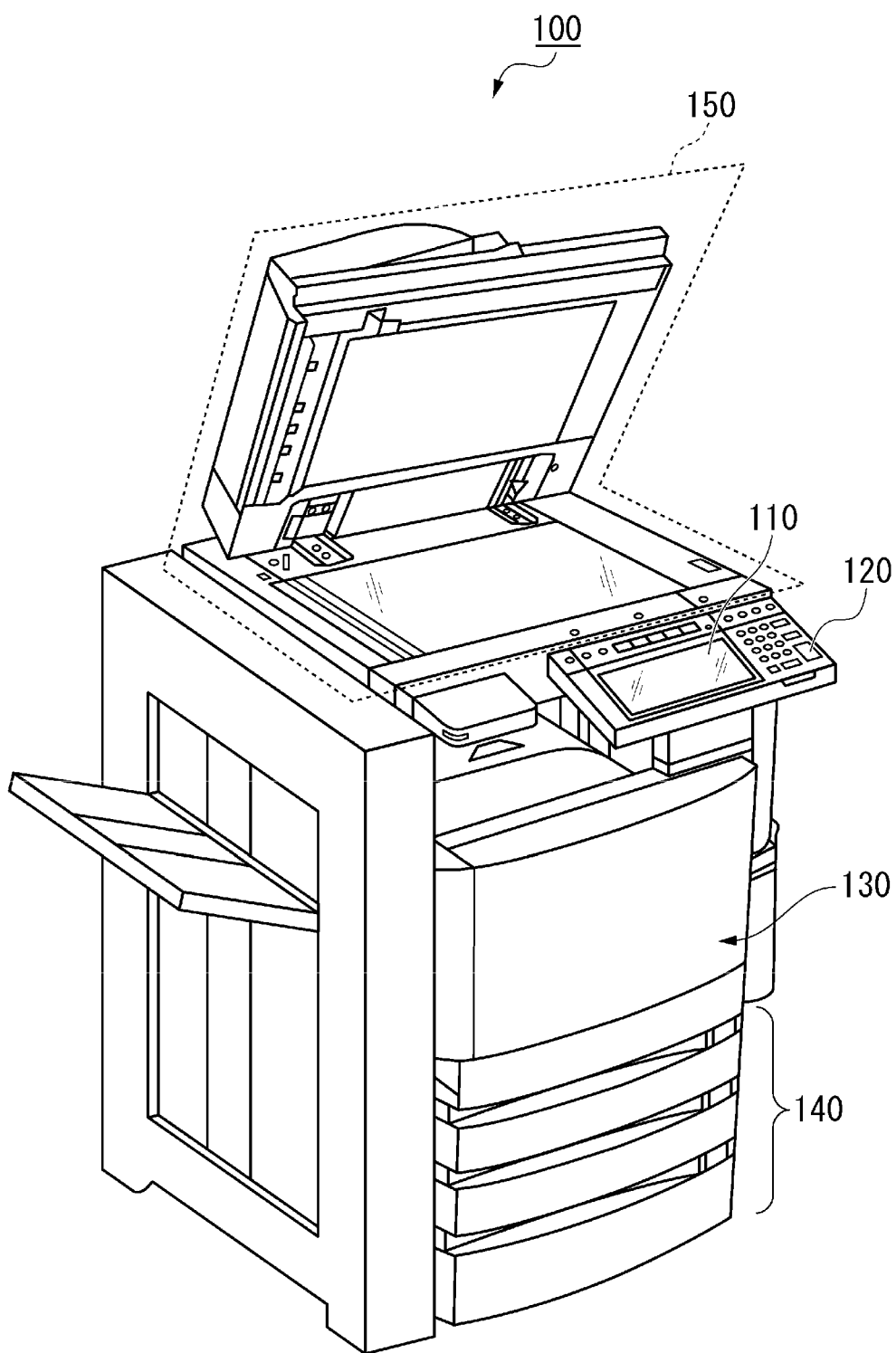
FIG. 1 is an external view of an image forming apparatus according to an embodiment.

First, the overall configuration of an image forming apparatus 100 will be described with reference to FIG. 1. FIG. 1 is an external view illustrating an example of the overall configuration of the image forming apparatus 100 of an embodiment. The image forming apparatus 100 is, for example, a multifunction peripheral. The image forming apparatus 100 includes a display 110, a control panel 120, a printer 130, a sheet storage section 140, and an image reading section 150.

The display 110 is, for example, a liquid crystal display with a touch panel. The display 110 displays various kinds of information. The display 110 receives an operation from a user.

The control panel 120 includes various input operation keys such as a numeric keypad and a start key. The control panel 120 receives various input operations from the user.

The control panel 120 outputs operation signals corresponding to various input operations received from the user to a control section.

The printer 130 performs a series of printing operations by using various kinds of information that are output from the display 110, the control panel 120, the image reading section 150, and the like. The series of printing operations includes an operation of inputting image information, an operation of forming an image, an operation of transferring a formed image onto a sheet, an operation of conveying a sheet, and the like.

The sheet storage section 140 includes a plurality of sheet cassettes. Each sheet cassette stores sheets.

The image reading section 150 includes an automatic original document feeder and a scanner device. The automatic original document feeder feeds an original document placed on an original document tray to the scanner device page by page. The scanner device optically scans an original document placed on an original glass table (document platen), and forms an image based on light reflected from the original onto a light receiving surface of a charge coupled device (CCD) sensor. The image reading section 150 generates image information (image data) by using the reading result from the scanner device.

Figure 2:
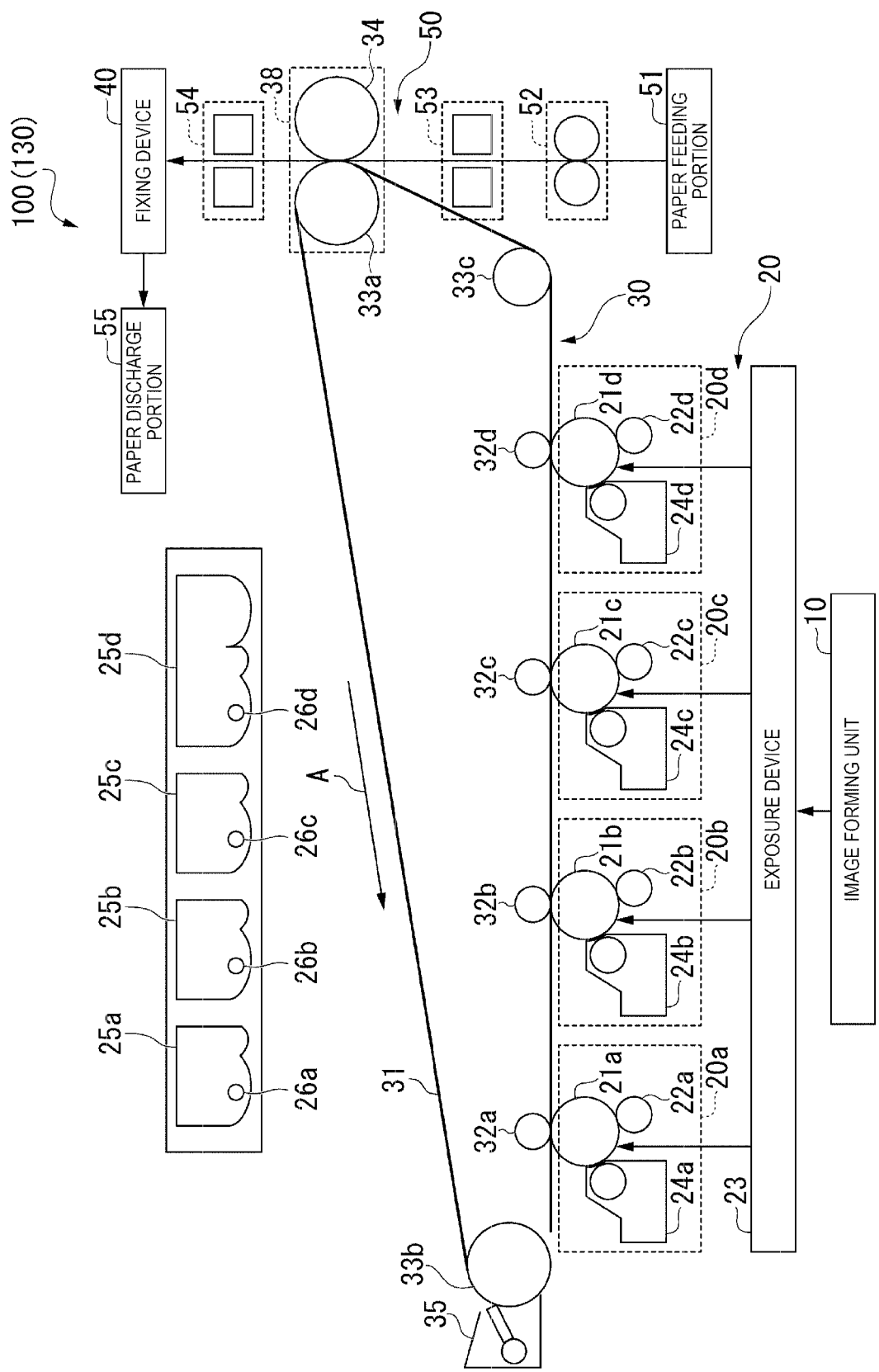
FIG. 2 depicts aspects of an internal configuration of an image forming apparatus according to an embodiment.

FIG. 2 is a diagram illustrating an example of an internal configuration of the image forming apparatus 100. As illustrated in FIG. 2, the image forming apparatus 100 (more particularly, the printer 130 portion of the image forming apparatus 100) includes four image forming units 20a to 20d. The image forming apparatus 100 is a so-called quadruple tandem type image forming apparatus. The image forming apparatus 100 includes an image processing unit 10, an image forming unit 20 (comprising image forming units 20a to 20d), an intermediate transfer unit 30, a fixing device 40, and a sheet conveying unit 50.

The image processing unit 10 receives image information (print data or the like). The received image information can be generated by the image reading section 150 or transmitted from another device. The image processing unit 10 performs digital image processing for processing the received image information according to initial settings or user settings. For example, the digital image processing includes a grayscale correction based on pre-established grayscale correction data. In addition to a grayscale correction, the digital image processing may include various correction processes such as color correction, and shading correction, and a compression process for image data.

Next, the image forming unit 20 will be described. The image forming unit 20 includes the image forming unit 20a corresponding to yellow (Y), the image forming unit 20b corresponding to magenta (M), the image forming unit 20c corresponding to cyan (C), and the image forming unit 20d corresponding to black (K). The respective image forming units 20a to 20d include photoconductive drums 21a to 21d, charging devices 22a to 22d, an exposure device 23, developing devices 24a to 24d, toner cartridges 25a to 25d, and drum cleaning devices. In the following description, since other than toner color, each of the image forming units 20a to 20d are substantially similar, image forming unit 20a will be described as representative.

The photoconductive drum 21a is, for example, a charge-type organic photoconductor (OPC) in which an undercoat layer, a charge generation layer, and a charge transport layer are stacked in this order on a peripheral surface of a conductive cylinder made of aluminum. The photoconductive drum 21a has photoconductivity.

The charging device 22a generates corona discharge. The charging device 22aa uniformly charges the surface of the photoconductive drum 21a.

The exposure device 23 is, for example, a semiconductor laser device. The exposure device 23 irradiates the photoconductive drum 21a with laser light corresponding to an image to the particular color of the image forming unit 20a to 20d. Here, the exposure device 23 forms an image on photoconductive drum 21a corresponding to the yellow color channel of the image to be formed. When the exposure device 23 applies the laser light, an electrostatic charge on the region of the surface of the photoconductive drum 21a irradiated with the laser light changes. Due to this change in the electrostatic potential, an electrostatic latent image is formed on the surface of the photoconductive drum 21a.

The developing device 24a stores a developer. The developing device 24a attaches toner of the yellow color component to the surface of the photoconductive drum 21a. Consequently, a yellow toner image is formed on the photoconductive drum 21s. In other words, the electrostatic latent image formed on the surface of the photoconductive drum 21a is converted to an image formed of toner (yellow toner in this instance).

As the developer, for example, a two-component developer can be used. The two-component developer has non-magnetic toner and a carrier. As the carrier, for example, iron powder having a particle size of several tens of microns (μm) or a polymer ferrite particle is used. The carrier is mixed with the toner in the developing device 24a and triboelectrically charged to give electric charge (for example, negative electric charge) to the toner. The carrier conveys the toner to an electrostatic latent image portion by an electromagnetic force.

Here, replenishment of toner in the developing device 24a will be described. When the toner cartridge 25a is inserted, a drive motor on a main body side of the image forming apparatus 100 and a toner stirring/replenishing auger 26a in the toner cartridge 25a are connected to each other (note, each toner cartridge 25a to 25d includes a corresponding auger 26a to 26d). When the toner stirring/replenishing auger 26a is rotated due to rotation of the drive motor, the toner is added to the developing device 24a through a replenishing port.

The drum cleaning device includes a cleaning blade that is in contact with the surface of the photoconductive drum 21a. The cleaning blade removes residual toner remaining on the surface of the photoconductive drum 21a after primary transfer. The removed residual toner is collected in a storage portion included in the drum cleaning device.

Next, the intermediate transfer unit 30 will be described. The intermediate transfer unit 30 includes an intermediate transfer member 31, a primary transfer roller 32, a plurality of support rollers 33, a secondary transfer roller 34, and a belt cleaning device 35.

The intermediate transfer member 31 is, for example, an endless belt (and may be referred to as a transfer belt). In general, the intermediate transfer member 31 is not conductive and is held taut by the various rollers. Specifically, for example, the intermediate transfer member 31 is a belt made of polyimide.

The support rollers 33a to 33c support the intermediate transfer member 31 such that tension is applied to the intermediate transfer member 31. The intermediate transfer member 31 is formed in a loop shape. Among the plurality of support rollers 33a to 33c, one support roller (for example, the support roller 33a) is a driving roller. The rollers other than the driving roller are driven rollers. The driving roller is driven and rotated by a motor or the like, and thus the intermediate transfer member 31 travels in a direction A in the drawing at a predetermined speed at a predetermined timing.

In view of the constant travel direction A in a loop, relative positioning of elements along the intermediate transfer member 31 may be referred to as being in an upstream direction or a downstream direction from another element along the intermediate transfer member 31. For example, the image forming unit 20a can be said to be upstream from the other image forming units 20b to 20d and the belt cleaning device 35 can be said to be downstream of the image forming units 20a to 20d.

A primary transfer roller 32a to 32d is respectively disposed to face a corresponding one of the photoconductive drums 21a to 21d with the intermediate transfer member 31 interposed therebetween. Specifically, the primary transfer roller 32a is disposed such that pressure is applied to the photoconductive drum 21a with the intermediate transfer member 31 interposed therebetween. Consequently, the primary transfer roller 32a and the photoconductive drum 21a form a primary transfer nip with the intermediate transfer member 31.

When the intermediate transfer member 31 passes through this primary transfer nip, the toner image formed on the photoconductive drum 21a is transferred onto the intermediate transfer member 31. When the intermediate transfer member 31 passes through the primary transfer nip, a primary transfer bias is applied to the primary transfer roller 32a. Specifically, the primary transfer roller 32a is charged with, for example, a charge having a polarity (positive polarity) opposite to that of the toner. Consequently, the toner image formed on the photoconductive drum 21a is electrostatically transferred onto the intermediate transfer member 31.

The secondary transfer roller 34 is disposed to face the support roller 33a with the intermediate transfer member 31 interposed therebetween. Specifically, the secondary transfer roller 34 is disposed such that pressure is applied to the support roller 33a with the intermediate transfer member 31 interposed therebetween. Consequently, the secondary transfer roller 34 and the support roller 33a form a secondary transfer nip 38 with the intermediate transfer member 31 through which a sheet is passed at an appropriate timing to receive the toner image from the intermediate transfer member 31.

When the sheet passes through the secondary transfer nip 38, the toner image formed on the intermediate transfer member 31 is transferred onto the sheet. When the sheet passes through the secondary transfer nip 38, a secondary transfer bias is applied to the support roller 33a. Specifically, the support roller 33a is charged with a charge having the same polarity (negative polarity) as the toner. Consequently, the toner image on the intermediate transfer member 31 is electrostatically transferred to the sheet.

The secondary transfer roller 34 and the support roller 33a are configured to be separable from each other. Thus, when a sheet is jammed at the secondary transfer nip 38, a user can remove the sheet.

The belt cleaning device 35 includes a cleaning blade that is in contact with the surface of the intermediate transfer member 31. The cleaning blade removes residual toner remaining on the surface of the intermediate transfer member 31 after the secondary transfer. The removed residual toner is collected in a storage portion included in the belt cleaning device 35.

The fixing device 40 heats and presses the sheet to which the toner image has been transferred. Consequently, the fixing device 40 fixes the toner image onto the sheet. The fixing device 40 may also employ a method of fixing a toner image onto a sheet by heating the sheet via a film-shaped member.

Next, the sheet conveying unit 50 will be described. The sheet conveying unit 50 includes a paper feeding portion 51, a register portion 52, a first guide portion 53, a second guide portion 54, and a paper discharge portion 55.

The paper feeding portion 51 conveys sheets stored in the sheet storage section 140 one by one to the register portion 52. The register portion 52 stops the sheet conveyed from the paper feeding portion 51, and then sends the sheet toward the secondary transfer portion 38 at a predetermined timing. The predetermined timing is a timing at which the toner image formed on the intermediate transfer member 31 is secondarily transferred by the secondary transfer portion 38. The first guide portion 53 guides the sheet sent from the register portion 52 to the secondary transfer portion 38.

The secondary transfer portion 38 transfers a toner image onto the sheet after the first guide portion 53. The secondary transfer portion 38 sends the sheet to which the toner image has how been transferred toward the fixing device 40.

The second guide portion 54 guides the sheet from the secondary transfer portion 38 to the fixing device 40. The fixing device 40 heats and presses the sheet, and then sends the sheet to the paper discharge portion 55. The paper discharge portion 55 sends the sheet to the discharge tray.

Next, configurations of a front cover and an auto duplex unit (ADU) cover will be described with reference to FIGS. 3A to 3D. An auto duplex unit may also be called a reversing unit or a sheet reversing unit in some instances. FIGS. 3A to 3D are explanatory diagrams illustrating example configurations of the front cover 300 and the ADU cover 310. As illustrated in FIGS. 3A to 3D, the image forming apparatus 100 includes a front cover 300 and an ADU cover 310. The direction arrow A illustrated in FIGS. 3A to 3D is the direction in which a user directly faces the image forming apparatus 100 from the front side. That is, direction arrow A represents the front view direction.

The front cover 300 is an openable and closable cover that covers the front side of the image forming apparatus 100. A grip portion 305 is provided on the front cover 300. FIG. 3A depicts the two covers 300 and 310 in their closed state. When the user holds the grip portion 305 and pulls the front cover 300 forward, the front cover 300 is opened, as illustrated in FIG. 3B. The front cover 300 is opened, and thus, for example, the user can replace toner. The front cover 300 is an example of a first opening/closing portion.

The ADU cover 310 is an openable and closable cover that covers the right-hand surface of the apparatus when viewed from the front. The ADU cover 310 is provided with an operation lever 315. When the user manipulates the operation lever 315 and opens the ADU cover 310, the ADU cover 310 is in an open state as illustrated in FIG. 3C. The ADU cover 310 is opened, and thus, for example, the user can remedy a sheet jam or the like. The ADU cover 310 is an example of a second opening/closing portion. As illustrated in FIG. 3D, the front cover 300 and the ADU cover 310 may be in an open state at the same time.

Next, various switches will be described. As illustrated in FIG. 3B, the image forming apparatus 100 includes a front cover switch 301 and a front side interlock switch 302. As illustrated in FIG. 3C, the image forming apparatus 100 includes an ADU cover switch 311 and an ADU side interlock switch 312. Each switch is, for example, a button type switch, and is depressed when the cover is in a closed state, and is not depressed when the cover is in an open state. In the following description, the front side interlock switch 302 and the ADU side interlock switch 312 may both be referred to as "interlock switches" if these switches are not required to be differentiated from each other.

The front cover switch 301 detects open and closed states of the front cover 300. The front cover switch 301 outputs a switch signal used to detect the open state of the front cover 300.

The ADU cover switch 311 detects open and closed states of the ADU cover 310. The ADU cover switch 311 outputs a switch signal used to detect the open state of the ADU cover 310.

The front side interlock switch 302 is a safety switch for turning off an internal power supply when the front cover 300 is opened. The ADU side interlock switch 312 is a safety switch for turning off the internal power supply when the ADU cover 310 is opened.

Here, in the image forming apparatus 100 according to the present embodiment, a "safety signal" detected when the front side interlock switch 302 is turned off (cover open state) and a "safety signal" detected when the ADU side interlock switch 312 is turned off (cover open state) are both input to a control section 810 (see FIG. 8) through one signal line due to a circuit board structure. This is because of the configurational design convenience for such a model.

However, as a result of such a design choice, control section 810 cannot readily determine whether it is the front cover 300 is in an open state or the ADU cover 310 in an open state on the basis of only the safety signal received via the control section 810. However, for convenience, the control section 810 determines that one of the covers is in an open state whenever the safety signal is input. In other words, the safety signal is preferentially assigned to an interlock switch of just one cover. That is, the safety signal received by the control section 810 is considered to indicate the opening of just one of the two possible covers without particular concern to the actual source of the safety signal. In the present embodiment, the safety signal is preferentially assigned to the front side interlock switch 302. In other examples, the safety signal may be preferentially assigned to the ADU side interlock switch 312.

Here, a description will be made of a behavior of a user opening the ADU cover 310. The user standing in front of the image forming apparatus 100 typically places his or her right hand on the operation lever 315. The user may open the ADU cover 310 by twisting the ADU cover 310. If the ADU cover 310 is twisted to be opened, the front side (the ADU side interlock switch 312 side in FIG. 3C) of the ADU cover 310 when viewed from the user may be opened first, and the back side thereof (the ADU cover switch 311 side in FIG. 3C) when viewed from the user may be opened later. In other words, as a result of the ADU side interlock switch 312 being turned off (open state), the safety signal may be input first, and then the ADU cover switch 311 may be turned off (signal an open state).

Thus, initially, only the safety signal alone may be input to the control section 810 when the ADU cover 310 is opened. If only the safety signal is input to the control section 810, since the safety signal has been preferentially assigned to the front side interlock switch 302, the control section 810 determines that the front side interlock switch 302 is in an open state. Therefore, when no further control is performed, the image forming apparatus 100 may perform a notification that the front cover 300 is in an open state when only the safety signal is received. In other words, when no further control is performed, the image forming apparatus 100 may perform a notification that a cover (front cover 300) that is different from the cover (ADU cover 310) actually in the open state is in an open state.

Therefore, in the present embodiment, when a cover is opened, a notification of the open state of the cover is not immediately performed, and thus an inappropriate notification is not performed. Hereinafter, details of a notification screen in which a notification of an open state of the cover is not immediately performed will be described with reference to FIGS. 4 and 5.

Figure 4:
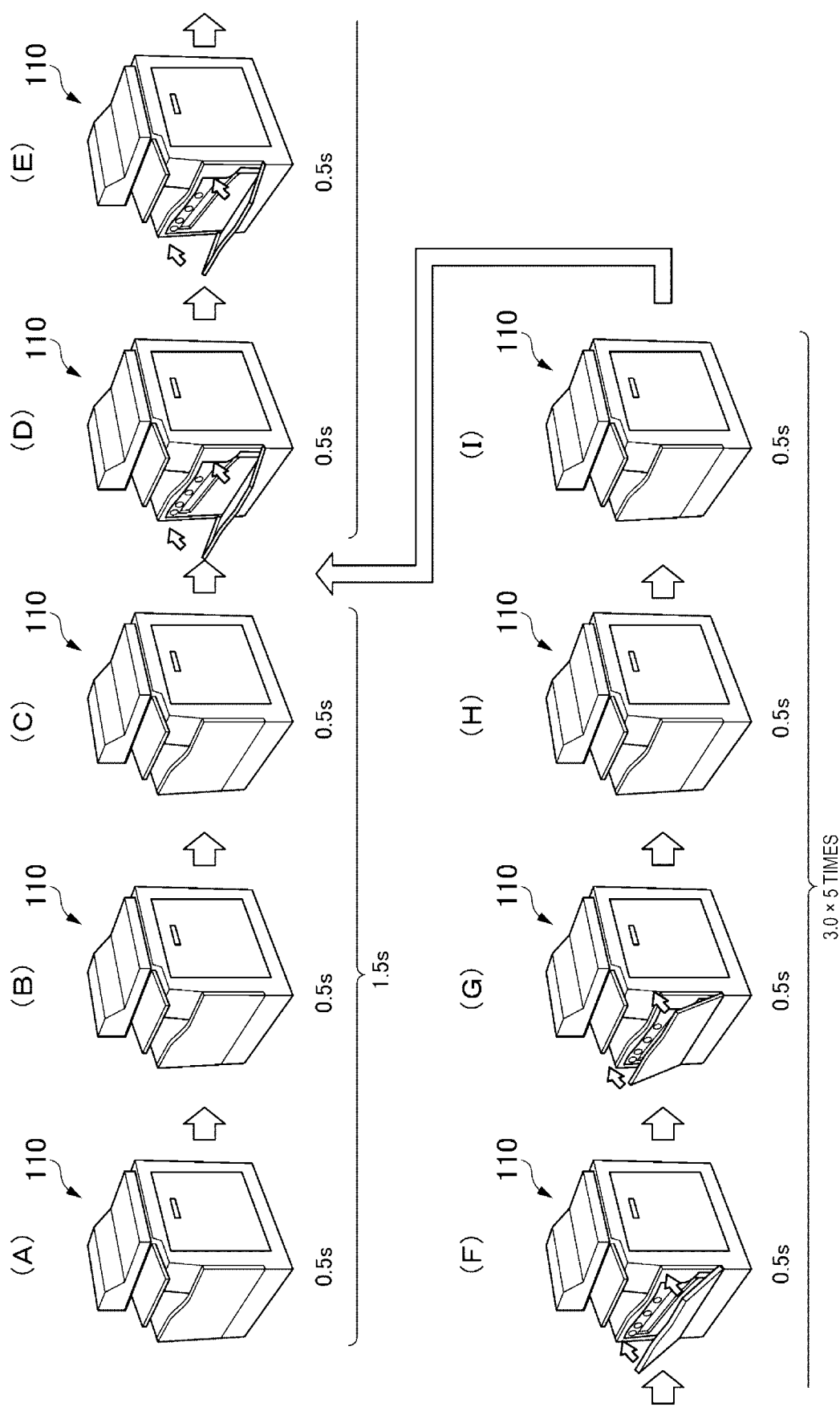
FIG. 4 is an explanatory diagram illustrating image display examples for a notification screen when the front cover is opened.

FIG. 4 is an explanatory diagram illustrating an example of a notification screen in which, when the front cover 300 is opened, the notification of the open state is not immediately performed. FIG. 4 includes image parts (A) to (I) that illustrate transitions (moving images) of screens displayed on the display 110 in sequence or the like. Each of the images parts (A) to (I) is displayed for 0.5 seconds before the next image part is displayed. The series of images illustrated in FIG. 4 correspond to a front cover open user interface (UI) display.

When the front cover 300 is opened, open state non-notification screens, as illustrated image parts (A) to (C), indicating that neither of the covers are in an open state are displayed for 1.5 seconds (0.5 seconds×3 frames) in total. Thereafter, screens prompting the front cover 300 to be closed, as illustrated in image parts (D) to (I) are displayed for 3 seconds (0.5 seconds×6 frames) in total. Specifically, image parts (D) to (I) in FIG. 4 illustrate screens in which the degree of opening of the front cover 300 becomes lower in sequence. The series of screens illustrated in by image parts (D) to (I) is displayed five times in a loop.

Thereafter, for example, the screen (still image) illustrated in FIG. 4 image part (D) is continuously displayed. The screen that is subsequently displayed at this point is not limited to the screen illustrated in FIG. 4, image part (D), and may be any screen or screens by which a notification of the open state of the front cover 300 can be performed. For example, the looping series of screens illustrated in FIG. 4, image parts (D) to (I) may be continuously repeated.

Figure 5:
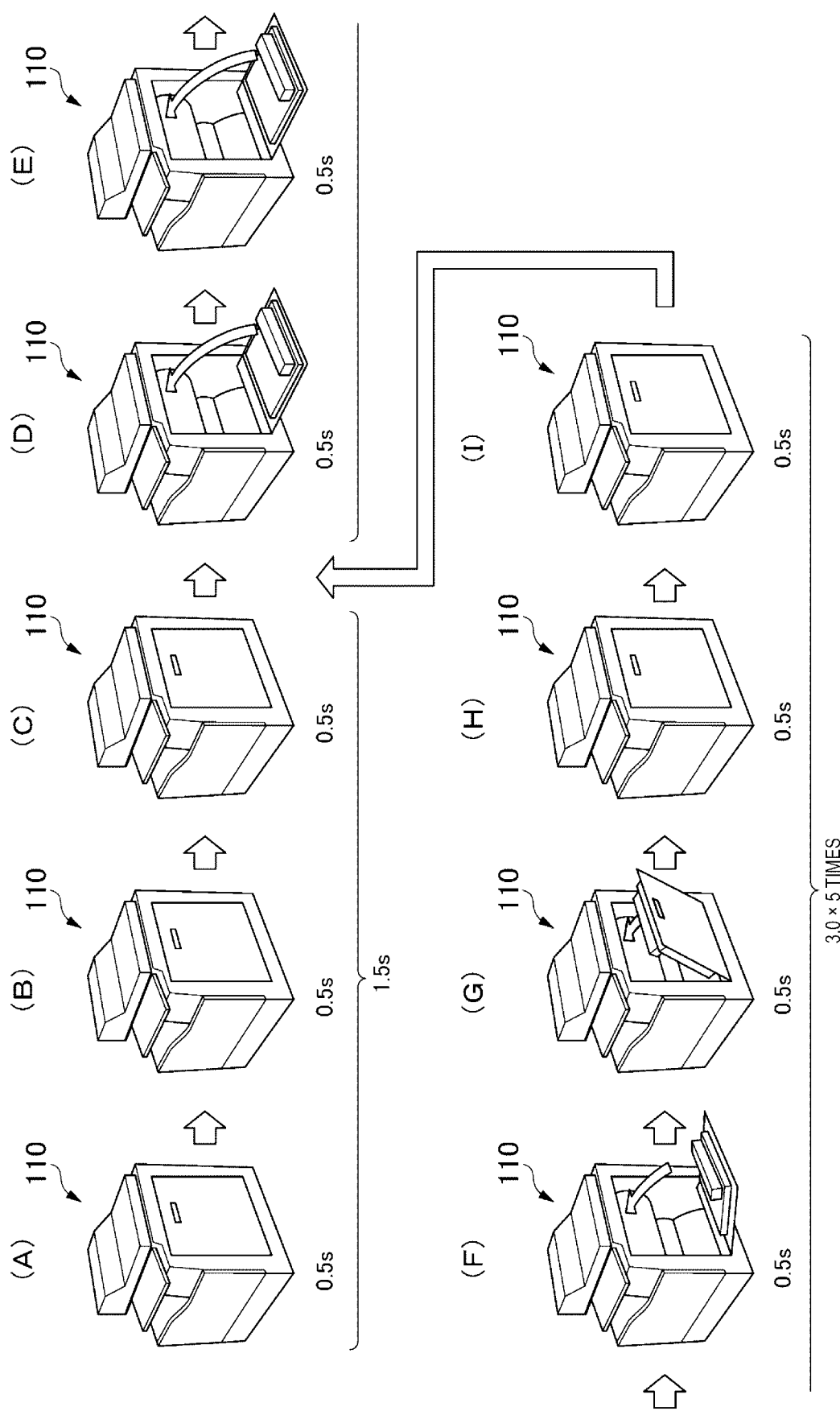
FIG. 5 is an explanatory diagram illustrating image display examples for a notification screen when the ADU cover is opened.

FIG. 5 is an explanatory diagram illustrating an example of a notification screen in which, when the ADU cover 310 is opened, the notification of the open state is not immediately performed. FIG. 5 illustrates image parts (A) to (I) illustrate transitions (moving images) of screens displayed on the display 110. Each of the images parts (A) to (I) is displayed for 0.5 seconds before the next image part is displayed. The series of images illustrated in FIG. 5 correspond to an ADU cover open UI display.

When the ADU cover 310 is opened, screens corresponding to image parts (A) to (C) indicating that neither of the covers are in an open state are displayed for 1.5 seconds (0.5 seconds×3 frames) in total. Thereafter, screens prompting the ADU cover 310 to be closed, as image parts (D) to (I) of FIG. 5, are displayed for 3 seconds (0.5 seconds×6 frames) in total. Specifically, image parts (D) to (I) in FIG. 5 illustrate screens in which the degree of opening of the ADU cover 310 becomes lower in sequence. The series of screens illustrated by image parts (D) to (I) is displayed five times in a loop.

Thereafter, for example, the screen (still image) illustrated in FIG. 5, image part (D) is continuously displayed. The screen that is subsequently displayed at this point is not limited to the screen illustrated in FIG. 5, image part (D), and may be any screen or screens by which a notification of the open state of the ADU cover 310 can be performed. For example, the looping series of screens illustrated in FIG. 5, image parts (D) to (I) may be continuously repeated.

Next, a description will be made of a notification when each cover is changed from an open state to a closed state. Even when each cover is closed, only the safety signal may be temporarily received by the control section 810. Specifically, for example, when the ADU cover 310 is changed from an open state to a closed state, the ADU cover switch 311 is first turned on (indicating a closed state), and then the ADU side interlock switch 312 is turned on (indicating a closed state). In other words, a semi-locked state may occur in which the safety signal may still be input after the ADU cover switch 311 has already turned. This semi-locked state may exist until the ADU side interlock switch 312 is finally turned on.

Therefore, when no further control is performed, a notification of an open state of the front cover 300 may be performed since only the safety signal (which has been preferentially as signed to the front cover 300 opening) is being input during the semi-locked state. In other words, when no further control is performed, a notification of an open state of the front cover 300 may be erroneously performed despite it being the actual case that the ADU cover 310 is in an open state (more particularly, a semi-locked state).

Therefore, in the present embodiment, when the front cover 300 or the ADU cover 310 is changed from an open state to a closed state, a present notification screen can be maintained for a certain period. Hereinafter, with reference to FIGS. 6 and 7, a description a notification screen displayed for a certain period after a cover state change from open to close is made.

Figure 6:
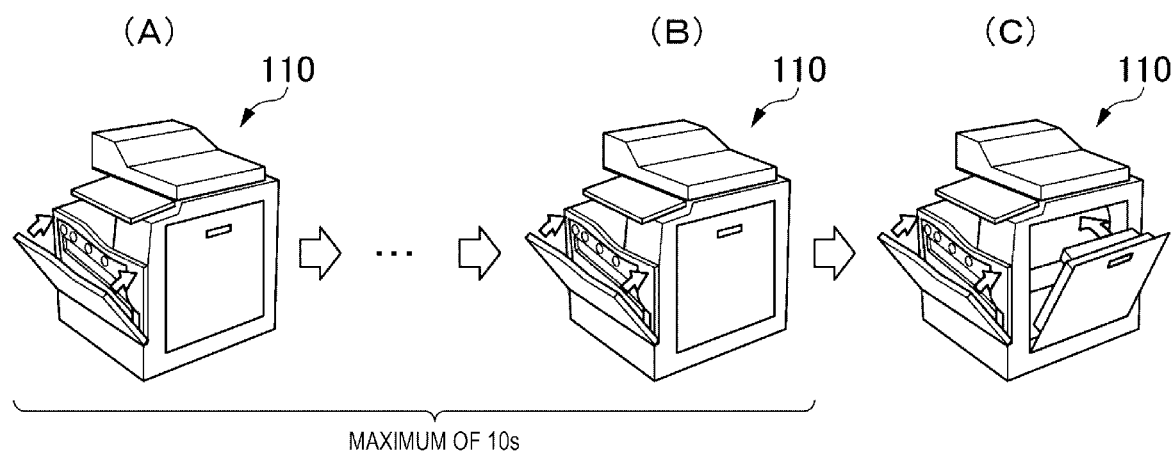
FIG. 6 is an explanatory diagram illustrating image display examples for a notification screen when the front cover is changed from an open state to a closed state.

FIG. 6 is an explanatory diagram illustrating an example of a notification screen display for when the front cover 300 is changed from an open state to a closed state. For example, FIG. 6 image part (A) illustrates a screen similar to the screen (refer to FIG. 4, image part (D)) displayed after display of the series of screens illustrated in FIG. 4. The screen illustrated in FIG. 6 image part (A) is a screen displayed when the front cover switch 301 is initially turned on (indicating the closed state) while the front side interlock switch 302 is still turned off (indicating the open state).

The screen illustrated in FIG. 6 image part (A) is continuously displayed until the front side interlock switch 302 is turned on (indicating the closed state). When this occurs, FIG. 6 image part (B) can be momentarily displayed. That is, when the front side interlock switch 302 is finally turned on (indicating the closed state), the screen illustrated in image part (A) is finished with display, and a normal screen (standby screen or the like) returns.

The screen illustrated in FIG. 6 image part (A) is continuously displayed for up to 10 seconds while the front side interlock switch 302 is still turned off (indicating the open state). When 10 seconds has elapsed with the front side interlock switch 302 still being turned off (indicating the open state), the image forming apparatus 100 can then determine that the ADU cover 310 may be in an open state. Therefore, as illustrated in FIG. 6 image part (C), a screen indicating that both of front cover 300 and ADU cover 310 are in an open state is displayed.

Figure 7:
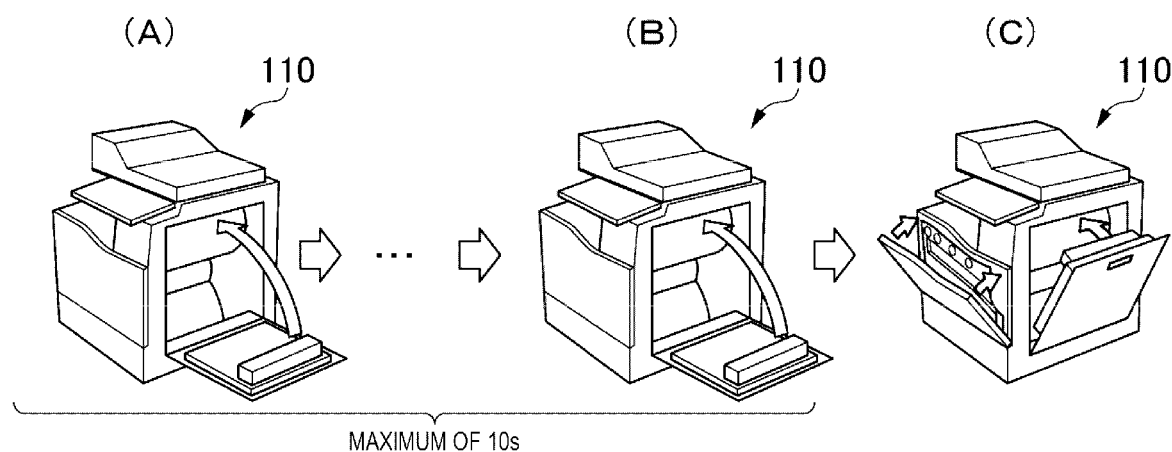
FIG. 7 is an explanatory diagram illustrating image display examples for a notification screen when the ADU cover is changed from an open state to a closed state.

FIG. 7 is an explanatory diagram illustrating an example of a notification screen display for when the ADU cover 310 is changed from an open state to a closed state. For example, FIG. 7 image part (A) illustrates a screen similar to the screen (refer to FIG. 5 image part (D)) displayed after display of the series of screens illustrated in FIG. 5. The screen illustrated in FIG. 7 image part (A) is a screen displayed the ADU cover switch 311 is initially turned on (indicating the closed state) while the ADU side interlock switch 312 is still turned off (indicating the open state).

The screen illustrated in FIG. 7 image part (A) is continuously displayed until the ADU side interlock switch 312 is turned on (indicating the closed state). When this occurs, FIG. 7 image part (B) can be momentarily displayed. That is, when the ADU side interlock switch 312 is turned on (indicating the closed state), the screen illustrated in FIG. 7 image part (A) is finished with display, and a normal screen (standby screen or the like) returns.

The screen illustrated in FIG. 7 image part (A) can be continuously displayed for up to 10 seconds while the ADU side interlock switch 312 is still turned off (indicating the open state). When 10 seconds has elapsed with the ADU side interlock switch 312 still being turned off (indicating the open state), the image forming apparatus 100 can then determine that the front cover 300 may be in the open state. Therefore, as illustrated in FIG. 7 image part (C), a screen indicating that both of the front cover 300 and the ADU cover 310 are in an open state is displayed.

Figure 8:
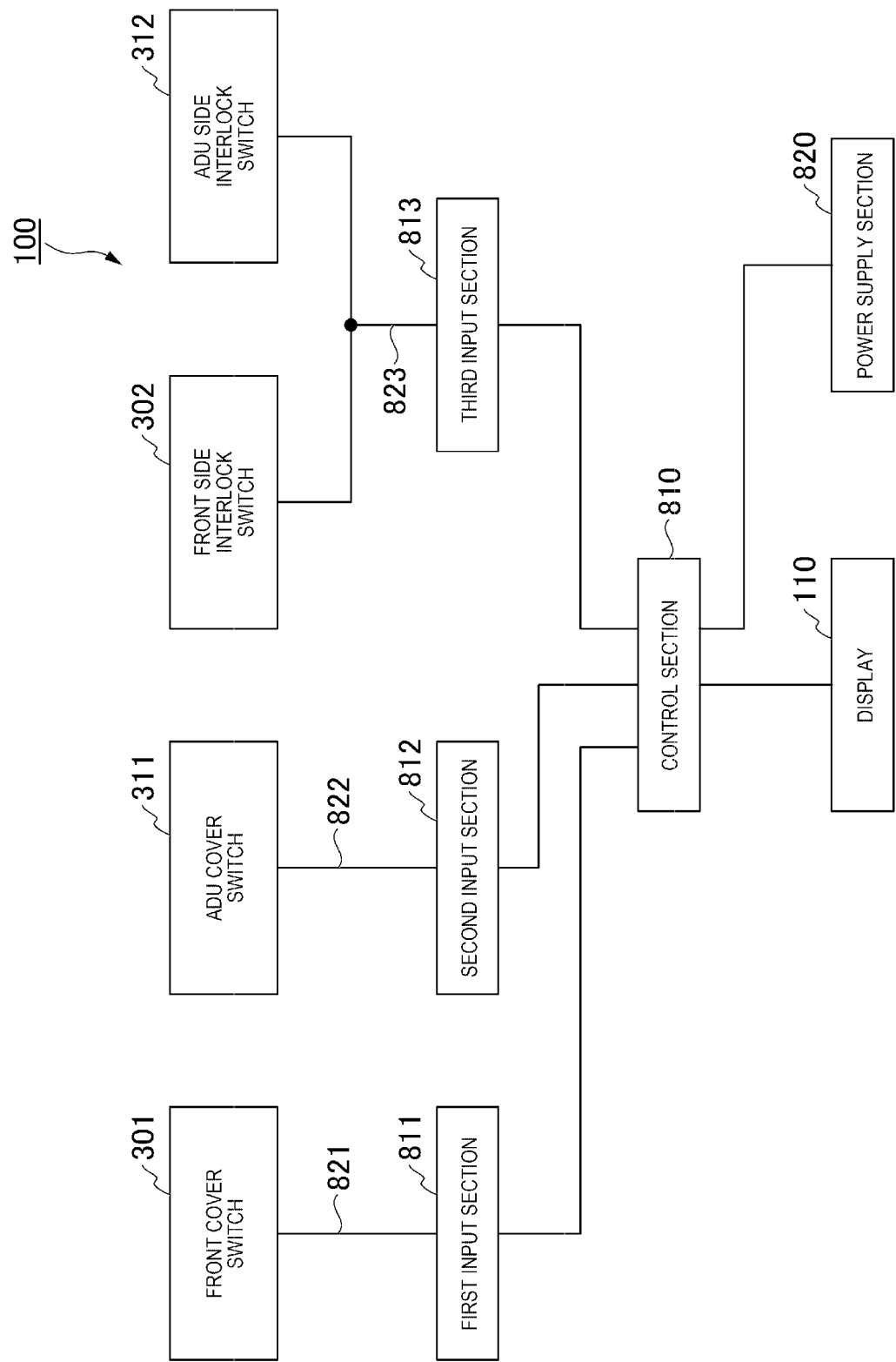
FIG. 8 depicts a functional configuration of an image forming apparatus according to an embodiment.

Next, a functional configuration of the image forming apparatus 100 will be described with reference to FIG. 8. As illustrated in FIG. 8, the image forming apparatus 100 includes the display 110, the front side interlock switch 302, the front cover switch 301, the ADU side interlock switch 312, the ADU cover switch 311, and a first input section 811, a second input section 812, a third input section 813, a control section 810, and a power supply section 820.

In the present embodiment, the first opening/closing portion is the front cover 300 and the second opening/closing portion is the ADU cover 310, but the covers may be reversed in other examples. In other words, the first opening/closing portion may be the ADU cover 310 and the second opening/closing portion may be the front cover 300.

The first input section 811, the second input section 812, and the third input section 813 are, for example, input terminals disposed on a circuit board or the like. The first input section 811 is connected to the front cover switch 301 on a one-to-one basis via a first signal line 821. The second input section 812 is connected to the ADU cover switch 311 on a one-to-one basis via a second signal line 822. The third input section 813 is connected to the front side interlock switch 302 and the ADU side interlock switch 312 on a one-to-two basis via a third signal line 823. In other words, the third input section 813 receives a signal from the two connected switches via just one signal line (more particularly, the third signal line 823).

A detection result of the front cover switch 301 is input to the first input section 811. Specifically, a first signal for a notification of an open state of the front cover 300 is input to the first input section 811. The first signal is, for example, a signal indicating open and closed states of the front cover 300, and includes, specifically, a signal indicating an open state of the front cover 300 and a signal indicating a closed state of the front cover 300. Hereinafter, the first signal will be referred to as a "front cover switch (SW) signal".

A detection result of the ADU cover switch 311 is input to the second input section 812. Specifically, a second signal for a notification of an open state of the ADU cover 310 is input to the second input section 812. The second signal is, for example, a signal indicating open and closed states of the ADU cover 310, and includes, specifically, a signal indicating an open state of the ADU cover 310 and a signal indicating a closed state of the ADU cover 310. Hereinafter, the second signal will be referred to as an "ADU cover SW signal".

Detection results of the front side interlock switch 302 and the ADU side interlock switch 312 are input to the third input section 813. Specifically, the third input section 813 receives a third signal for interrupting the power supply to the apparatus (e.g., disconnect or turn off power supply section 820) when either the front cover 300 or the ADU cover 310 is in an open state. The third signal includes, for example, a safety signal indicating that at least one of the front cover 300 and the ADU cover 310 is in open state and a signal indicating that both covers are in a closed state. Hereinafter, the third signal will be referred to as an "interlock SW signal".

The power supply section 820 supplies power to various motors, and drive units such as the image forming unit 20 and the fixing device 40. The control section 810 interrupts the power supply of the power supply section 820 if the safety signal is input to the third input section 813. The control section 810 is an example of a notification controller.

The control section 810 performs a notification of an open state of the front cover 300 and/or the ADU cover 310 on the basis of the front cover SW signal, the ADU cover SW signal, and the interlock SW signal. A description will be made of the notifications of the open state of the front cover 300 and the ADU cover 310 performed by the control section 810.

If any one of the front cover SW signal, the ADU cover SW signal, and the interlock SW signal indicates an open state, the control section 810 does not immediately perform a notification of the open state of front cover 300 or ADU cover 310. The control section 810 waits for a predetermined period to elapse before performing the notification. For example, in the present embodiment, if both of the front cover SW signal and the ADU cover SW signal indicate a closed state and the interlock SW signal indicates an open state, the control section 810 does not perform a notification of an open state of the front cover 300 or the ADU cover 310 before the predetermined period elapses. Also, the control section 810 does not perform a notification of an open state of the front cover 300 or the ADU cover 310 before a predetermined period elapses if the front cover SW signal indicates an open state or if the ADU cover SW signal indicates an open state. Hereinafter, delaying a notification of an open state of the front cover 300 or the ADU cover 310 for a predetermined period after an initial detection event may be referred to as "non-notification control".

In the present embodiment, the control section 810 performs this non-notification control if any one of the front cover SW signal, the ADU cover SW signal, or the interlock SW signal indicates an open state. In other words, the control section 810 performs the non-notification control when either the front cover SW signal or the ADU cover SW signal indicates an open state regardless of whether or not the interlock SW signal also indicates an open state. Specifically, if either one of the front cover SW signal or the interlock SW signal indicates an open state, the control section 810 displays the front cover open UI display illustrated in FIG. 4. If just the ADU cover SW signal indicates an open state, the control section 810 performs the ADU cover open UI display illustrated in FIG. 5.

However, in some examples, the control section 810 need not perform non-notification control if either the front cover SW signal or the ADU cover SW signal indicates an open state. That is, if, for example, the ADU cover switch 311 is turned off (indicating the ADU cover 310 is open) earlier than the ADU side interlock switch 312, the control section 810 may not display the open state non-notification screen (refer to FIG. 5, image parts (A) to (C)), but may rather display the series of screens illustrated in FIG. 5, image parts (D) to (I).

In the present embodiment, the predetermined period for which a notification of an open cover state is not performed is 1.5 seconds (refer to FIG. 4, image parts (A) to (C) and FIG. 5, image parts (A) to (C)). In general, this predetermined non-notification period is selected to be a time somewhat longer than an expected time difference between a cover switch and an interlock switch signaling of an open cover state when a cover is opened by a user. More specifically, the predetermined non-notification period may be, for example, a period slightly longer than the time lag between when both the ADU side interlock switch 312 side is opened and the ADU cover switch 311 side is opened during a normal user opening of the ADU cover 310. The predetermined non-notification period is not limited to 1.5 seconds and may be set to any time.

Next, a notification after elapse of a predetermined non-notification period will be described. If either the front cover SW signal or the ADU cover SW signal has indicated an open cover state during the predetermined non-notification period, the control section 810 performs a notification of an open state according to either the front cover SW signal or the ADU cover SW signal after the elapsing of the predetermined non-notification period. For example, the control section 810 performs a notification of an open state of the front cover 300 if, at some point during the predetermined non-notification period, the front cover SW signal indicates an open state. Similarly, the control section 810 performs a notification of an ADU cover 310 open state after the elapsing of the predetermined non-notification period if the ADU cover SW signal indicates an open state during the predetermined non-notification period.

Thus, in the present embodiment, a notification of an open cover state can be performed according to either the front cover SW signal or the ADU cover SW signal after the elapse of the predetermined non-notification period (for example, approximately 1.5 seconds), but also such a notification may be performed before the elapse of the predetermined period in some situations. For example, the control section 810 may perform a notification of an open state whenever either the front cover SW signal or the ADU cover SW signal indicates an open cover state if the ADU cover switch 311 is initially turned on (indicating a closed state) when the open state non-notification screen of the front cover open UI (refer to FIG. 4) is being displayed. More specifically, the series of screens illustrated in FIG. 5, image parts (D) to (I) may be displayed when the ADU cover switch 311 is turned off (indicating an open cover state).

If both of the front cover SW signal and the ADU cover SW signal indicate an open cover state at some point during the predetermined non-notification period, a notification that both of the covers are open may be performed after the elapse of the predetermined non-notification period. Specifically, after the open state non-notification screen in the front cover open UI (refer to FIG. 4) has been displayed, a screen (refer to FIG. 6 image part (C)) indicating that both of the front cover 300 and the ADU cover 310 are in an open state may be displayed.

The notification performed by the control section 810 is, for example, a notification using a screen on the display 110. However, this notification may include a notification performed by outputting a voice or sound from a sound output section (e.g., a speaker), or may include a notification performed by turning on a predetermined signal lamp on the control panel 120.

Next, a specific example of the non-notification control will be described. The control section 810 does not indicate either front cover 300 or ADU cover 310 is in an open state during a predetermined non-notification period. Specifically, the control section 810 displays the open state non-notification screen (refer to FIG. 4, image parts (A) to (C) and FIG. 5, image parts (A) to (C)) during the predetermined non-notification period. However, a screen displayed during the predetermined non-notification period is not limited to such specific screens, and may be, for example, a normal standby screen or a screen on which text such as "Wait" is displayed.

In non-notification control, for example, a screen (refer to FIG. 6 image (C)) indicating that all the covers are in an open state could be displayed as temporary warning/advisory screen. However, if this is done, there may be a notification to the user that a cover is in an open state even though at least one of the covers is not actually in the open state. Thus, a user may try to close a cover that is not presently open, which is not an appropriate notification.

Next, a description will be made of a notification when each cover is changed from an open state to a closed state. After a first notification of an open state of front cover 300 has been performed, the control section 810 continues the first notification if the front cover SW signal indicates a closed state and the interlock SW signal still indicates an open state. The first notification corresponds to, for example, the screen illustrated in FIG. 6 image part (A).

After a second notification of an open state of the ADU cover 310 has been performed, the control section 810 continues the second notification if the ADU cover SW signal indicates a closed state and the interlock SW signal still indicates an open state. The second notification corresponds to, for example, the screen illustrated in FIG. 7 image part (A).

If the interlock SW signal indicates an open state during a certain period (for example, 10 seconds) after either the first notification or the second notification has been shown, the control section 810 performs a third notification that both front cover 300 and ADU cover 310 are in an open state. The third notification corresponds to, for example, either of the screen illustrated in FIG. 6 image part (C) or the screen illustrated in FIG. 7 image part (C).

The certain period may be, for example, at least a period longer than the time lag between both of when the ADU cover switch 311 side is first closed and the ADU side interlock switch 312 side is closed after the ADU cover 310. More specifically, the certain period may be a time longer than the time for which the interlock SW signal is expected to indicate a closed state after either the front cover SW signal or the ADU cover SW signal initially indicates the closed state during normal user opening/closing of the covers. The certain period is not limited to 10 seconds and may be set to any time.

Figure 9:
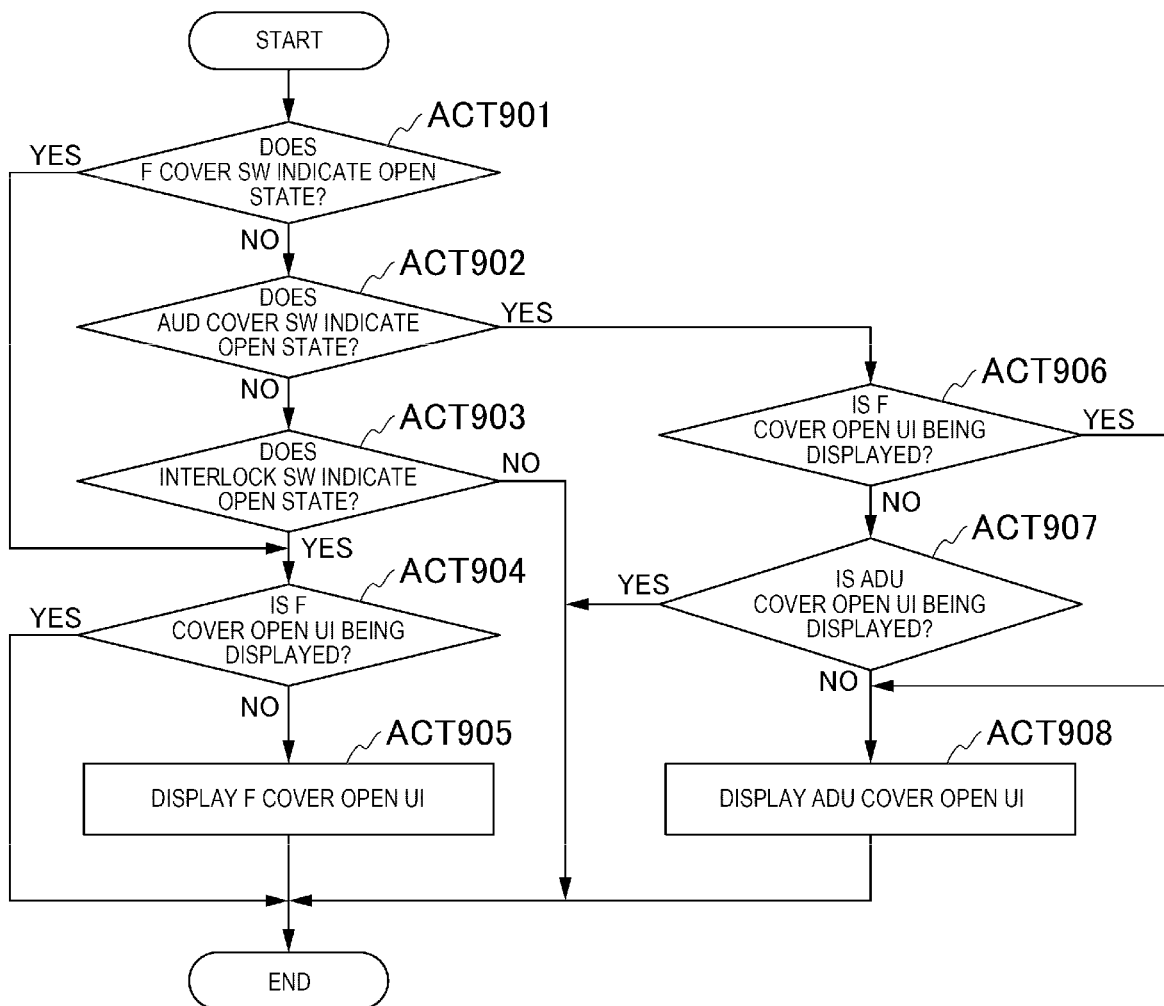
FIG. 9 is a flowchart of a notification process performed by an image forming apparatus according to an embodiment when a cover is opened.

The control section 810 is realized by, for example, a central processing unit (CPU). In other words, the function of the control section 810 is realized by the CPU executing a program. The process according to the present embodiment is not limited to being performed by the CPU executing a program. For example, the process according to the present embodiment may be performed by using hardware (e.g., dedicated circuit sections or circuitry) such as a large-scale integration (LSI), an application specific integrated circuit (ASIC), a field programmable gate array (FPGA), or a graphics processing unit (GPU). The process according to the present embodiment may be performed by software and hardware in cooperation. Notification Process Performed by Image Forming Apparatus 100 When Cover Is Brought into Open State Next, a description will be made of an example of a notification process performed by the image forming apparatus 100 when a cover is opened with reference to FIG. 9. FIG. 9 is a flowchart illustrating an example of the notification process performed by the image forming apparatus 100 when a cover is opened. The process illustrated in the flowchart of FIG. 9 is assumed to be running at all times (or periodically at a very short time interval) in the image forming apparatus 100 when powered on. In the following flowchart, for simplification of the description, a case where the front cover 300 and the ADU cover 310 are in an open state together will be omitted from the specific description, but, in general, such related processing combines the described processing for the individual opening of these covers.

The present description assumes a priority is placed one of the cover open UI displays (either a front cover open UI display or ADU cover open UI display) when any switch (the front cover switch 301, the ADU cover switch 311, and the interlock switches) is turned off (indicating a cover open state). The cover open UI display having the highest priority in this example is the front cover open UI display when the front cover switch 301 is turned off (indicating a cover open state). The cover open UI display having the second highest priority in this example is the ADU cover open UI display when the ADU cover switch 311 is turned off (indicating a cover open state). The cover open UI display having the lowest priority is the front cover open UI display when to the interlock switch is turned off.

In FIG. 9, the image forming apparatus 100 determines whether or not the front cover switch 301 is turned off (cover open state) (ACT 901). If the front cover switch 301 is turned off (ACT 901: YES), the image forming apparatus 100 proceeds to ACT 904. If the front cover switch 301 is not turned off (ACT 901: NO), the image forming apparatus 100 next determines whether the ADU cover switch 311 is turned off (cover open state) (ACT 902).

If the ADU cover switch 311 is not turned off (ACT 902: NO), that is, if the ADU cover 310 is closed, the image forming apparatus 100 next determines whether an interlock switch (either one of the front side interlock switch 302 or the ADU side interlock switch 312) is turned off (cover open state) (ACT 903).

If no interlock switch is turned off (ACT 903: NO), that is, if both covers are closed, the image forming apparatus 100 finishes the process. On the other hand, if an interlock switch is turned off (ACT 903: YES), the image forming apparatus 100 next determines whether the front cover open UI display (refer to FIG. 4) is presently being performed (ACT 904). If the front cover open UI display is already being performed (ACT 904: YES), the image forming apparatus 100 finishes the process.

If the front cover open UI display is not being performed in ACT 904 (ACT 904: NO), the image forming apparatus 100 then performs the front cover open UI display on the display 110 (ACT 905) and finishes the series of processes. The open state non-notification screen (refer to FIG. 4, image parts (A) to (C)) is displayed for 1.5 seconds when the front cover open UI display is initially performed.

Since the safety signal is preferentially assigned to the front side interlock switch 302, if only the interlock switch is turned off (indicating a cover open state) (ACT 901: NO, ACT 902: NO and ACT 903: YES), the front cover open UI display is performed.

In ACT 902, if the ADU cover switch 311 is turned off (indicating a cover open state) (ACT 902: YES), the image forming apparatus 100 next determines whether the front cover open UI display (refer to FIG. 4) is presently being performed (due to only the interlock switch being turned off) (ACT 906). The front cover open UI display in ACT 906 is the cover open UI display having the lowest priority. In ACT 906, the open state non-notification screen (refer to FIG. 4, image parts (A) to (C)) is displayed for the 1.5 seconds when the front cover open UI display is initially performed.

If the front cover open UI display (for example, the open state non-notification screen) is not already being performed in ACT 906 (ACT 906: NO), the image forming apparatus 100 next determines whether or not the ADU cover open UI (refer to FIG. 5) is presently being displayed (ACT 907). If the ADU cover open UI display is being performed (ACT 907: YES), the image forming apparatus 100 finishes the series of processes.

On the other hand, if the ADU cover open UI display is not being performed (ACT 907: NO), the image forming apparatus 100 performs the ADU cover open UI display on the display 110 (ACT 908) and finishes the series of processes. If the front cover open UI display (for example, the open state non-notification screen) is being performed in ACT 906 (ACT 906: YES), the image forming apparatus 100 proceeds to ACT 908 so as to perform the ADU cover open UI display on the display 110, and finishes the series of processes.

When the ADU cover open UI display in ACT 908 is performed after the front cover open UI display in ACT 906 is finished, the open state non-notification screen is displayed at the beginning of the ADU cover open UI display (refer to FIG. 5, image parts (A) to (C)), and is thus displayed for a maximum of 1.5 seconds (0.5 seconds×3 frames). Therefore, if an open state non-notification screen (refer to FIG. 4, image parts (A) to (C)) is displayed for the front cover open UI display that was previously performed, an open state non-notification screen may be displayed for a maximum of 3.0 seconds (0.5 seconds×6 frames).

If the ADU cover open UI display is performed after the front cover open UI display has finished, since the open state non-notification screen was already displayed in the front cover open UI display, the open state non-notification screen need not be displayed at the beginning of the ADU cover open UI display. In order to prevent the open state non-notification screen from being displayed again, data regarding an ADU cover open UI display that does not include the open state non-notification screen(s) may be prepared in advance. If the flow proceeds from ACT 906 to ACT 908, the image forming apparatus 100 may perform the ADU cover open UI display indicated by such data in ACT 908.

The priority of cover open UI display when each switch is turned off will be further described. The front cover open UI display (hereinafter referred to as "first UI display") due to the front cover switch 301 being turned off is performed if the front cover switch 301 is turned off (cover open) as illustrated in the process flow of ACT 901: YES to ACT 904 then ACT 905. In other words, the first UI display is performed whether or not the ADU cover switch 311 is turned off and whether or not the interlock switch is turned off. Thus, the processing of ACT 902 and ACT 903 need not be performed. Thus, the first UI display (as triggered by front cover switch 301) is the cover open UI display having the highest priority in this context since the other switch states are not evaluated before display of the first UI display.

As illustrated in process flow of ACT 901: NO to ACT 902: NO to ACT 908, the ADU cover open UI display (hereinafter referred to as "second UI display") as triggered by the ADU cover switch 311 being turned off is the next highest priority cover open UI display. In other words, the second UI display is performed whenever the ADU cover switch 311 indicates a cover open state and the front cover switch 301 does not indicate a cover open state. The second UI display can be performed without it being determined whether the interlock switch in ACT 903 is turned off or not. Thus, the second UI display is cover open UI display having the second highest priority after the first UI display.

Figure 10:
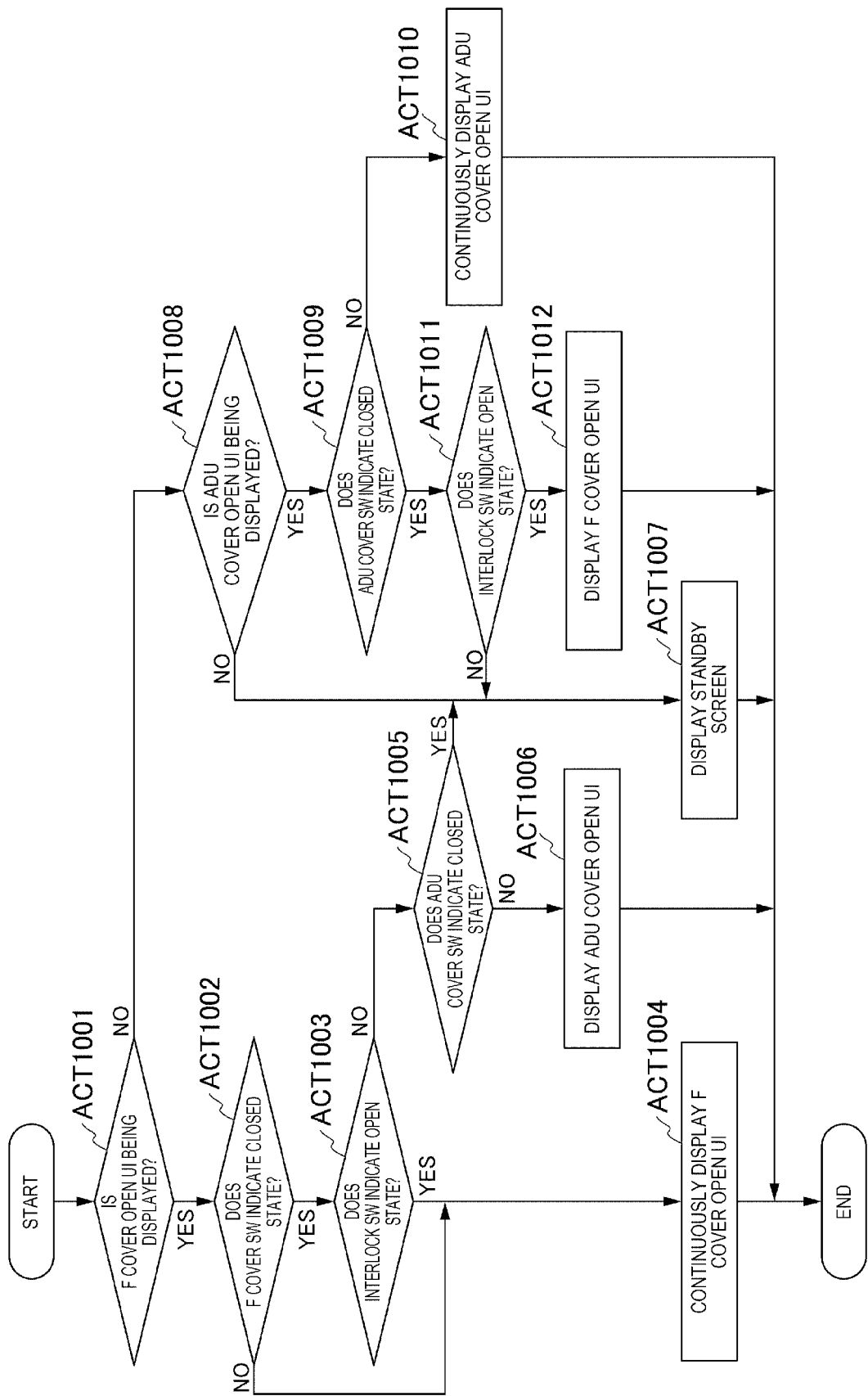
FIG. 10 is a flowchart of a notification process performed by an image forming apparatus according to an embodiment when a cover is changed from an open state to a closed state.

As illustrated in process flow of ACT 901: NO to ACT 902: NO to ACT 903: YES to ACT 904: NO to ACT 905, the front cover open UI display (hereinafter referred to as "third UI display") triggered by the interlock switch being turned off when both the front cover switch 301 and the ADU cover switch 311 are still turned on (indicating a cover closed state) is the next (third) highest priority in this context. In other words, the third UI display is not performed if either the front cover switch 301 or the ADU cover switch 311 is turned off (cover open). Thus, the third UI display is cover open UI display having the lowest priority. Notification Process Performed by Image Forming Apparatus 100 When A Cover Is Changed from Open to Closed Next, a description will be made of an example of a notification process performed by the image forming apparatus 100 when a cover is changed from an open state to a closed state with reference to FIG. 10. FIG. 10 is a flowchart illustrating an example of the notification process performed by the image forming apparatus 100 when a cover is changed from an open state to a closed state. The process illustrated in the flowchart of FIG. 10 is assumed to be running at all times (or at least periodically at a very short time interval) in the image forming apparatus 100. In the following flowchart, for simplification of the description, a case where the front cover 300 and the ADU cover 310 are both in an open state together will be omitted, but, in general, such processing combines the individual processing associated with the individual states.

In FIG. 10, the image forming apparatus 100 first determines whether the front cover open UI display (for example, the still image in FIG. 4 image part (D)) is presently being performed (ACT 1001). If the front cover open UI display is being performed (ACT 1001: YES), the image forming apparatus 100 next determines whether the front cover switch 301 is turned on (indicating a cover closed state) (ACT 1002). If the front cover switch 301 is not turned on (ACT 1002: NO), the image forming apparatus 100 proceeds to ACT 1004.

On the other hand, if the front cover switch 301 is turned on (ACT 1002: YES), the image forming apparatus 100 next determines whether an interlock switch (either one of the front side interlock switch 302 or the ADU side interlock switch 312) is turned off (indicating a cover open state) (ACT 1003).

If the interlock switch is turned off (ACT 1003: YES), the image forming apparatus 100 continuously performs the front cover open UI display (ACT 1004) and finishes the series of processes. In other words, for a semi-locked state in which the front cover switch 301 side of the front cover 300 is first closed and then the front side interlock switch 302 side is opened, the image forming apparatus 100 continuously performs the front cover open UI display.

On the other hand, if the interlock switch is not turned off (ACT 1003: NO), that is, if both of the interlock switches are turned on (indicating cover closed state), the image forming apparatus 100 then determines whether the ADU cover switch 311 is turned on (cover closed state) (ACT 1005). If the ADU cover switch 311 is not turned on (ACT 1005: NO), the image forming apparatus 100 next performs the ADU cover open UI display (ACT 1006) and finishes the process. If the ADU cover switch 311 is turned off (ACT 1005: NO), the image forming apparatus 100 displays a standby screen (ACT 1007) and finishes the series of processes.

If the front cover open UI display is not being performed in ACT 1001 (ACT 1001: NO), the image forming apparatus 100 next determines whether the ADU cover open UI display (for example, the still image in FIG. 5 image part (D)) is presently being performed (ACT 1008). If the ADU cover open UI display is not being performed (ACT 1008: NO), the image forming apparatus 100 proceeds to ACT 1007 and displays a standby screen.

On the other hand, if the ADU cover open UI display is being performed (ACT 1008: YES), the image forming apparatus 100 next determines whether the ADU cover switch 311 is turned on (indicating a cover closed state) (ACT 1009). If the ADU cover switch 311 is not turned on (ACT 1009: NO), the image forming apparatus 100 continuously performs the ADU cover open UI display (ACT 1010) and finishes the process.

On the other hand, if the ADU cover switch 311 is turned on (ACT 1009: YES), the image forming apparatus 100 next determines whether the interlock switch (either one of the front side interlock switch 302 or the ADU side interlock switch 312) is turned off (indicating a cover open state) (ACT 1011).

If an interlock switch is turned off (ACT 1011: YES), the image forming apparatus 100 performs the front cover open UI display (ACT 1012) and finishes the series of processes.

On the other hand, if an interlock switch is not turned off (ACT 1011: NO), that is, if both of the switches are turned on (indicating cover closed state), the image forming apparatus 100 then proceeds to ACT 1007 so as to display a standby screen, and finishes the series of processes.

In the above-described embodiment, if any one of the front cover switch 301, the ADU cover switch 311, and the interlock switches (302 and 312) indicates an open state, a notification of an open state of the front cover 300 or the ADU cover 310 is not performed before a predetermined non-notification period (1.5 seconds) elapses. Specifically, in the present embodiment, if both of the front cover switch 301 and the ADU cover switch 311 indicate a closed state but an interlock switch (302 or 312) indicates an open state, a notification of an open state of the front cover 300 and the ADU cover 310 is delayed for a predetermined non-notification period (e.g., 1.5 seconds). Consequently, if only an interlock switch (either 302 or 312, which share a common signal line) indicates an open state, a notification that a cover (for example, the front cover 300) preferentially assigned to the safety signal is in an open state may not be performed initially. Specifically, when the ADU cover 310 is opened, if the ADU side interlock switch 312 is turned off (indicating a cover open) before the ADU cover switch 311, a user can be prevented from seeing wrong notification information, such as mistakenly notifying the user that the front cover 300 is in an open state when it is the ADU cover 310 which is being opened. Therefore, an appropriate notification can be performed and thus a user can be prevented being misinformed of an open state of a particular cover.

In the present embodiment, if one of the front cover switch 301 and the ADU cover switch 311 still indicates an open state after 1.5 seconds of the open state non-notification screen (e.g., FIG. 4, image parts (A) to (C)) being displayed, a notification of an open cover state according to the particular switch (or switches) indicating the open state is then performed. Therefore, for example, even if the front cover open UI display (FIG. 4) starts to be performed, the display can be replaced with the ADU cover open UI display (FIG. 5). Consequently, a notification that a cover is in an open state can be appropriately performed.

In the present embodiment, a notification that either the front cover 300 or the ADU cover 310 is in an open state can be delayed by using the open state non-notification screen (e.g., FIG. 4, image parts (A) to (C)), which actually part of a series of open state notification screens triggered by a switch opening (indicating an open cover state).

In the present embodiment, if the first notification (refer to FIG. 6 image part (A)) indicating an open state of the front cover 300 is being performed, and then the front cover switch 301 indicates a closed state but an open state of an interlock switch is continued, the first notification is continued. If the second notification indicating an open state of the ADU cover 310 is being performed, and then the ADU cover switch 311 indicates a closed state but an open state of an interlock switch is continued, the second notification (refer to FIG. 7(A)) is continued. Consequently, for the semi-locked state when the ADU cover 310 is closed, a notification that the front cover 300 (which preferentially assigned to the safety signal) is in an open state can be prevented from being performed. Specifically, an inappropriate notification can be prevented, such as notifying that the front cover 300 is in an open state when the ADU cover 310 is in the semi-locked state. Therefore, an appropriate notification can be performed and thus a user can be prevented from being misinformed of an open state of a cover.

If either the first notification or the second notification is continued, and then an interlock switch indicates an open state during a certain period, a third notification that both of the front cover 300 and the ADU cover 310 are in an open state can be performed. Consequently, if the image forming apparatus 100 cannot determine which particular cover is in an open state, the image forming apparatus 100 can prompt a user to close both of the covers.

The functions of the image forming apparatus 100 may be realized by a computer implementing a software program or the like. In this case, a program for realizing the functions may be recorded on a non-transitory computer-readable recording medium, and the program may be read and executed by a computer or a computer system. Here, a "computer system" includes an operating system (OS) and additional hardware such as peripheral devices. A "computer readable recording medium" refers to a portable medium such as a flexible disk, a magneto-optical disk, a ROM, or a CD-ROM, or an internal storage device such as a hard disk. The "computer readable recording medium" may an external storage device such as an external disk drive, a server, a cloud-based storage device, or the like accessible by a communication line permitting the program to be transmitted and/or operated through a network such as the Internet or a communication line such as a telephone line. The program may comprise modular programs for realizing some of the above-described functions and/or may be a program for realizing the above-described functions in combination with a program or programs already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus, comprising:
a controller having a first input terminal configured to receive a first signal indicating a state of a first opening/closing portion, a second input terminal configured to receive a second signal indicating a state of a second opening/closing portion, and a third input terminal configured to receive a third signal indicating a state of the first opening/closing portion and the second opening/closing portion, wherein
the controller is configured to delay a first notification of an open state of the first opening/closing portion and a second notification of an open state of the second opening/closing portion for a predetermined period after any one of the first signal, second signal, or third signal initially indicates an open state, and
the controller is configured to:
continue the first notification if the first signal indicates a closed state and the third signal indicates an open state after the first notification has been started, and
continue the second notification if the second signal indicates the closed state and the third signal indicates the open state after the second notification has been started.

2. The image forming apparatus according to claim 1, wherein if one of the first signal and the second signal indicates an open state during the predetermined period, the controller is configured to perform the first notification or the second notification according to the one of the first signal and the second signal that indicates the open state during the predetermined period.

3. The image forming apparatus according to claim 1, wherein neither the first notification of an open state of the first opening/closing portion nor the second notification of an open state of the second opening/closing portion is performed during the predetermined period.

4. The image forming apparatus according to claim 1, wherein the controller is further configured to perform a third notification indicating that both the first opening/closing portion and the second opening/closing portion are in an open state if the third signal indicates the open state within a certain time period after either the first notification or the second notification has been continued.

5. The image forming apparatus according to claim 1, wherein the first opening/closing portion is a front cover.

6. The image forming apparatus according to claim 5, wherein the second opening/closing portion is an auto-duplex unit cover.

7. The image forming apparatus according to claim 1, wherein the second opening/closing portion is an auto-duplex unit cover.

8. The image forming apparatus according to claim 1, wherein the third signal is generated by either of a first interlock switch on the first opening/closing portion or a second interlock switch on the second opening/closing portion.

9. The image forming apparatus according to claim 8, wherein the first and second interlock switches share a single signal line connected to the third input terminal.

10. The image forming apparatus according to claim 8, wherein the third signal is for triggering a power supply interrupt of the image forming apparatus.

11. The image forming apparatus according to claim 1, further comprising:
a display screen configured to display images to a user, wherein
the controller is configured to perform notifications as a series pre-stored images on the display screen.

12. The image forming apparatus according to claim 11, wherein
the delay in the first notification is provided as a series of non-notification images, and
the first notification is provided as a series of notification images after the series of non-notification images.

13. The image forming apparatus according to claim 11, wherein
the delay in the second notification is provided as a series of non-notification images, and
the second notification is provided as a series of notification images after the series of non-notification images.

14. An image forming apparatus, comprising:
a display screen configured to display images to a user;
a first cover configured to cover a first portion of a main body;
a first cover switch configured to provide a first signal indicating a state of the first cover;
a first interlock switch configured to provide a first interlock signal indicating a state of the first cover;
a second cover covering a second portion of the main body;
a second cover switch configured to provide a second signal indicating a state of the second cover;
a second interlock switch configured to provide a second interlock signal indicating a state of the second cover; and
a controller having a first input terminal configured to receive the first signal, a second input terminal configured to receive the second signal, and a third input terminal configured to receive the first interlock signal and the second interlock signal in an undifferentiated manner, wherein
the controller is configured to delay a first notification of an open state of the first cover and a second notification of an open state of the second cover for a predetermined period after any one of the first signal, second signal, the first interlock signal, or the second interlock signal initially indicates an open state,
the controller is configured to perform notifications as a series pre-stored images on the display screen,
the delay in the first notification is provided as a series of non-notification images,
the first notification is provided as a series of notification images after the series of non-notification images,
the delay in the second notification is provided as a series of non-notification images, and
the second notification is provided as a series of notification images after the series of non-notification images.

15. The image forming apparatus according to claim 14, wherein if one of the first signal and the second signal indicates an open state during the predetermined period, the controller is configured to perform the first notification or the second notification according to the one of the first signal and the second signal that indicates the open state during the predetermined period.

16. An image forming apparatus, comprising:
a display screen configured to display images to a user; and a controller having a first input terminal configured to receive a first signal indicating a state of a first opening/closing portion, a second input terminal configured to receive a second signal indicating a state of a second opening/closing portion, and a third input terminal configured to receive a third signal indicating a state of the first opening/closing portion and the second opening/closing portion, wherein the controller is configured to delay a first notification of an open state of the first opening/closing portion and a second notification of an open state of the second opening/closing portion for a predetermined period after any one of the first signal, second signal, or third signal initially indicates an open state, the controller is configured to perform notifications as a series pre-stored images on the display screen, the delay in the first notification is provided as a series of non-notification images, and the first notification is provided as a series of notification images after the series of non-notification images.

17. The image forming apparatus according to claim 16, wherein if one of the first signal and the second signal indicates an open state during the predetermined period, the controller is configured to perform the first notification or the second notification according to the one of the first signal and the second signal that indicates the open state during the predetermined period.

18. An image forming apparatus, comprising:
a display screen configured to display images to a user; and
a controller having a first input terminal configured to receive a first signal indicating a state of a first opening/closing portion, a second input terminal configured to receive a second signal indicating a state of a second opening/closing portion, and a third input terminal configured to receive a third signal indicating a state of the first opening/closing portion and the second opening/closing portion, wherein the controller is configured to delay a first notification of an open state of the first opening/closing portion and a second notification of an open state of the second opening/closing portion for a predetermined period after any one of the first signal, second signal, or third signal initially indicates an open state, the controller is configured to perform notifications as a series pre-stored images on the display screen, the delay in the second notification is provided as a series of non-notification images, and the second notification is provided as a series of notification images after the series of non-notification images.

19. The image forming apparatus according to claim 18, wherein if one of the first signal and the second signal indicates an open state during the predetermined period, the controller is configured to perform the first notification or the second notification according to the one of the first signal and the second signal that indicates the open state during the predetermined period.

* * * * *